(12) United States Patent
Hu et al.

(10) Patent No.: US 9,390,134 B2
(45) Date of Patent: Jul. 12, 2016

(54) REGULAR EXPRESSION MATCHING METHOD AND SYSTEM, AND SEARCHING DEVICE

(75) Inventors: Rui Hu, Beijing (CN); Jian Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 819 days.

(21) Appl. No.: 13/339,043

(22) Filed: Dec. 28, 2011

(65) Prior Publication Data

US 2012/0102055 A1 Apr. 26, 2012

Related U.S. Application Data

(63) Continuation of application No. PCT/CN2009/072982, filed on Jul. 29, 2009.

(51) Int. Cl.
*G06F 17/30* (2006.01)

(52) U.S. Cl.
CPC .... *G06F 17/30516* (2013.01); *G06F 17/30867* (2013.01)

(58) Field of Classification Search
CPC ................................................ G06F 17/30867
USPC ......................................................... 707/754
IPC .................................................. G06F 17/30867
See application file for complete search history.

(56) References Cited

U.S. PATENT DOCUMENTS

| 2003/0065800 | A1 | 4/2003 | Wyschogrod et al. |
| 2005/0086520 | A1 | 4/2005 | Dharmapurikar et al. |
| 2005/0273450 | A1* | 12/2005 | McMillen et al. ................ 707/1 |
| 2008/0071765 | A1 | 3/2008 | Ichiriu et al. |
| 2008/0140662 | A1* | 6/2008 | Pandya ............................ 707/6 |

FOREIGN PATENT DOCUMENTS

| CN | 101075980 A | 11/2007 |
| CN | 101359325 A | 2/2009 |

OTHER PUBLICATIONS

International Search Report and Written Opinion of the International Searching Authority, issued in corresponding PCT Patent Application No. PCT/CN2009/072982, mailed Sep. 24, 2009.

(Continued)

*Primary Examiner* — Mahesh Dwivedi
*Assistant Examiner* — Johnese Johnson
(74) *Attorney, Agent, or Firm* — Brinks Gilson & Lione

(57) ABSTRACT

A regular expression matching method and system, and a searching device are provided. First, the searching device performs string filtering on a data stream to be matched, in which if keywords in the data stream and preset character words have at least one same character, the searching device indicates that the data stream passes through the string filtering. Then the searching device performs regular expression filtering on the data stream passing through the string filtering. In a string filtering process through the method, system, and device, when Hash mapping positions of the keywords of the data stream are a subset of the Hash mapping positions of the character words, it indicates that the data stream passes through the string filtering, and it is not required to store the keywords and further compare the keywords with the character words, thereby saving the storage space and improving performance.

10 Claims, 8 Drawing Sheets

Perform a string filtering on a data stream to be matched, if keywords in the data stream and preset character words have at least one same character, indicating that the data stream passes through the string filtering. — 41

Perform regular expression filtering on the data stream that passes through the string filtering. — 42

(56) References Cited

OTHER PUBLICATIONS

Extended European Search Report issued in corresponding European Patent Application No. 09847702.9, mailed Apr. 5, 2012.
Jing et al., "Deep Packet Inspection Algorithm Based on Regular Expressions" Computer Applications, vol. 27, No. 9, 2007.
Navarro et al., "New Techniques for Regular Expression Searching" 2005. XP-002446890.
Sheu et al., "A Novel Hierarchical Matching Algorithm for Intrusion Detection Systems" IEEE Globecom 2005.
Office Action issued in corresponding Chinese Patent Application No. 200980155222.8, mailed Jan. 28, 2013.

* cited by examiner

| 0 | 0 | 0 | 0 | 0 | 0 | 0 | 0 | 0 | 0 | 0 | 0 |
FIG. 1
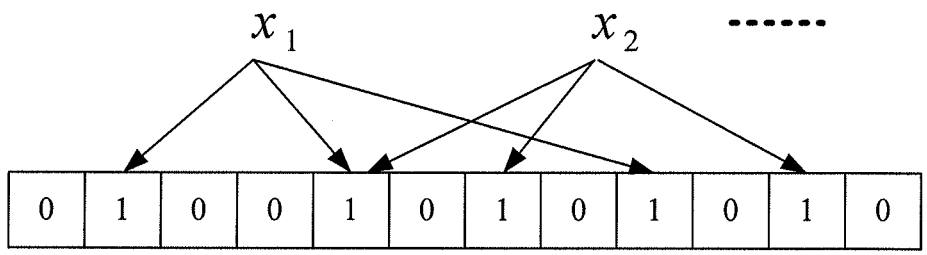
FIG. 2
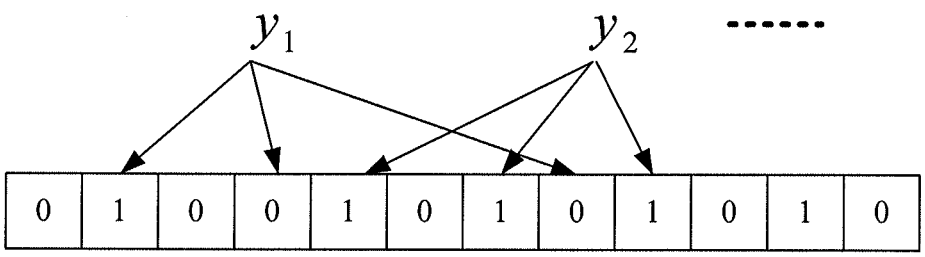
FIG. 3

REGULAR EXPRESSION MATCHING METHOD AND SYSTEM, AND SEARCHING DEVICE

CROSS-REFERENCE TO RELATED APPLICATIONS

This application is a continuation of International Application No. PCT/CN2009/072982, filed on Jul. 29, 2009, which is hereby incorporated by reference in their entireties.

FIELD

The present disclosure relates to the field of information processing technologies, and in particular, to a regular expression matching method and system, and a searching device.

BACKGROUND

With the increasing abundance of Internet Protocol (IP) network bearer services, and the increasing importance of network security requirements, it is not enough for a data communication device to merely identify information of four layers or below the four layers of the Transfer Control Protocol (TCP)/IP suite. The Deep Packet Inspection (DPI) technology may implement deep parsing of a packet, a working process of the DPI is a process of comparing a data stream of a packet payload with a character word base, and the corresponding processing is performed by determining whether the packet payload matches one or more in the character word base. The matching may include string matching and regular expression matching, and it is currently proved that the DPI efficiency is higher by using the regular expression matching. However, the operation complexity of the regular expression matching is in direct proportion to the length of the packet to be matched, and when the length of the packet is longer, the operation complexity of the regular expression matching is higher.

One of the current solutions is to use a modified regular expression matching method, and a process of this current solution is generally as follows: String filtering is first performed on the data stream of the packet to be matched, and regular expression filtering is then performed on the data stream passing through the string filtering, in which an algorithm used by the corresponding string matching or the regular expression matching is used in each filtering process. That is to say, the packet is first grouped, the length of each group is shorter, and the corresponding regular expressions are fewer accordingly, so the operation complexity may be reduced compared with the case that the regular expression filtering is performed on the total packet on the whole. In the prior art, a precise matching method is used during the string filtering, that is, the string filtering can be passed only when keywords in the data stream to be matched are completely same with the character words. Such a precise matching manner requires to store the keywords in the data stream to be matched, and probably, requires to further compare the keywords with the character words.

In the implementation of the present disclosure, the inventor finds that the prior art has at least the following problems. The keywords in the data stream need to be stored in the prior art, thereby occupying a larger space, and the performance may be reduced since it is required to further compare the keywords with the character words.

SUMMARY

The present disclosure provides a regular expression matching method and system, and a searching device, so as to solve the problems that a larger space is occupied because keywords need to be stored and that performance is reduced because it is required to further compare the keywords with character words.

An embodiment of the present disclosure provides a regular expression matching method, where the method includes: performing, in a processor, string filtering on a data stream to be matched. If keywords in the data stream and preset character words have at least one same character, the processor indicates that the data stream passes through the string filtering. The processor then performs regular expression filtering on the data stream passing through the string filtering.

An embodiment of the present disclosure provides a searching device having a processor, where the device includes: a string filtering module, configured to perform string filtering on a data stream to be matched, in which if keywords in the data stream and preset character words have at least one same character, it indicates that the data stream passes through the string filtering; and a regular expression filtering module, configured to perform regular expression filtering on the data stream passing through the string filtering.

An embodiment of the present disclosure provides a regular expression matching system, where the system includes the foregoing searching device and further includes an update device, in which the update device includes: a dividing module, configured to divide an input rule into a character word and a regular expression; a string rule base, obtained according to the character word, in which the string filtering module is configured to perform string filtering according to the string rule base; and a regular expression rule base, configured to store the regular expression, in which the regular expression filtering module is configured to perform regular expression filtering according to the regular expression rule base.

It can be seen from the foregoing technical solutions that, in the string filtering process according to the embodiments of the present disclosure, when the keywords in the data stream and the preset character words have the same characters, and both are not required to be completely same, it indicates that the data stream passes through the string filtering. Therefore, it is not required to store the keywords and further compare the keywords with the character words, thereby saving the storage space and improving the performance.

BRIEF DESCRIPTION OF THE DRAWINGS

FIG. 1 is a schematic structural view of an initial state of a bloom filter referred to in an embodiment of the present disclosure;

FIG. 2 is a schematic structural view of an after-being-set bloom filter referred to in an embodiment of the present disclosure;

FIG. 3 is a schematic structural view of a bloom filter, during determination, referred to in an embodiment of the present disclosure;

DETAILED DESCRIPTION OF THE EMBODIMENTS

Figure 4:
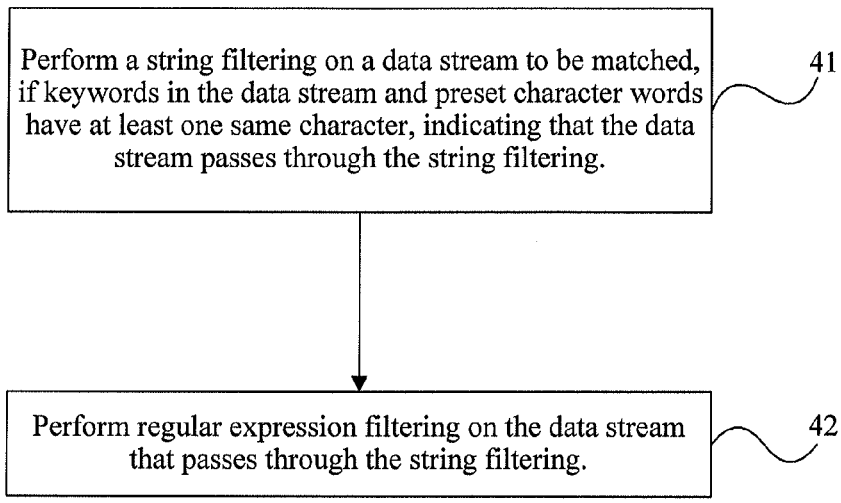
FIG. 4 is a schematic flow chart of a method according to Embodiment 1 of the present disclosure.

The present disclosure is described in further detail below with reference to the accompanying drawings and embodiments.

In order to better understand the embodiments of the present disclosure, the bloom filter technology referred to in the embodiments of the present disclosure is first described in the following.

A bloom filter is a random data structure with a high space efficiency, which uses a bit array to laconically indicate a set and determines whether an element belongs to the set. The bloom filter may determine the element not belonging to the set as an element belonging to the set, but may not determine the element belonging to the set as an element not belonging to the set. In an application scenario that a low error ratio can be tolerated, the bloom filter saves a lot of storage space through few errors.

FIG. 1 is a schematic structural view of an initial state of a bloom filter referred to in an embodiment of the present disclosure. Referring to FIG. 1, in the initial state, the bloom filter is a bit array containing m bits, and each bit is set to zero.

FIG. 2 is a schematic structural view of an after-being-set bloom filter referred to in an embodiment of the present disclosure. In order to express S={$x_1,x_2, \ldots, x_n$}, which is a set with n elements, the bloom filter uses k Hash functions independent from each other, and the functions map each element in the set into a position range {1, . . . ,m} . As for a random element x, a numerical value in the position $h_i(x)$ through the mapping of the ith Hash function is set to one ($1 \leq i \leq k$). When the numerical value in one position is set to one for many times, only the first time works, and the rest have no effect at all. For example, referring to FIG. 2, in this embodiment, k=3, and two Hash functions select a same position (the fifth position from left).

FIG. 3 is a schematic structural view of a Bloom filter, during determination, referred to in an embodiment of the present disclosure. When it is determined whether y belongs to a set (S), Hash operation is first performed on y for k times, and if the positions of all $h_i(y)(1 \leq i \leq k)$ are one, y is considered to be an element in the set; otherwise, y is considered not to be an element in the set. For example, referring to FIG. 3, $y_1$ is not an element in the set, while $y_2$ is an element in the set. Definitely, since different elements may be hashed to the same position, $y_2$ may actually belong to the set or may actually not belong to the set and be erroneously determined to be belonging to the set.

During precise string filtering in the prior art, after it is determined that mapping positions of one element are all one, in order to avoid erroneous determination, it is required to further compare keywords with character words. That is to say, in the prior art, a drop-down linked list is at a certain position of the bloom filter, and the linked list is configured to store the character words (for example, the set S). After it is determined that the mapping positions of one keyword are all one, the keyword (for example, $y_2$) further needs to be stored, and subsequently, $y_2$ is compared with the set S to determine whether $y_2$ really belongs to S. Only when $y_2$ really belongs to S, it indicates that $y_2$ passes through the string filtering.

However, since the regular expression matching process includes the string filtering and the regular expression filtering, the subsequent regular expression filtering is further performed on the data stream passing through the string filtering, and the subsequent regular expression filtering is proved to have a high efficiency and precision, so the previous string filtering is not required to have such precision, and moreover, the precise string filtering requires to occupy a large storage space and search for many times, which is not suitable to exchange meaningless precise string filtering for high space occupation and performance reduction.

The objective of the embodiment of the present disclosure is just to overcome the foregoing problems existing in the precise string filtering during the regular expression matching. The embodiments of the present disclosure are mainly based on the following ideas.

1. Likewise, in the embodiments of the present disclosure, the string filtering and the regular expression filtering are combined to perform the regular expression matching.

When the regular expression filtering is performed on the data stream to be matched on the whole, a large operation amount is required. For example, in a worst theoretical condition, the space complexity indicated by Non-deterministic Finite Automata (NFA) used by the regular expression with the length n is 0(n) and the time complexity is $0(n^2)$, while the space complexity indicated by Deterministic Finite Automata (DFA) is 0(2") and the time complexity is 0(1). The combination of the string filtering and the regular expression filtering has the following advantages.

First, the processing of the string filtering is relatively simple.

Second, the string filtering may divide the regular expressions into groups, each group merely corresponds to a few regular expressions, and most groups only have one regular expression for the snort (a network tool, configured for protocol analysis), thereby naturally lowering the processing complexity of the regular expression.

Third, the subsequent regular expression matching is only required for packets or packet segments matched with the string portion, and the pressure of the regular expression matching is mitigated accordingly, which helps to improve the performance.

2. In the embodiments of the present disclosure, precise filtering is not used during the string filtering, that is, the keywords are not required to be completely same with the character words, and therefore, it is not required to store the keywords and compare the keywords with the character words, thereby saving the storage space and improving the performance.

FIG. 4 is a schematic flow chart of a method according to Embodiment 1 of the present disclosure, where the method includes:

41: A searching device performs string filtering on a data stream to be matched, in which if keywords in the data stream and preset character words have at least one same character, it indicates that the data stream passes through the string filtering. The search device has at least one processor configured to implement the disclosed method.

42: The searching device performs regular expression filtering on the data stream passing through the string filtering.

In the string filtering process in this embodiment, when the keywords in the data stream and the preset character words have the same characters, and both are not required to be completely same, that is: it indicates that the data stream passes through the string filtering. Therefore, it is not required to store the keywords and further compare the keywords with the character words, thereby saving the storage space and improving performance.

The string filtering and the regular expression filtering may be performed according to a rule base obtained in advance, and therefore, the embodiments of the present disclosure further include a process of obtaining the corresponding rule base before the data stream is matched on the basis of Embodiment 1. The details are as described in Embodiment 2.

Figure 5:
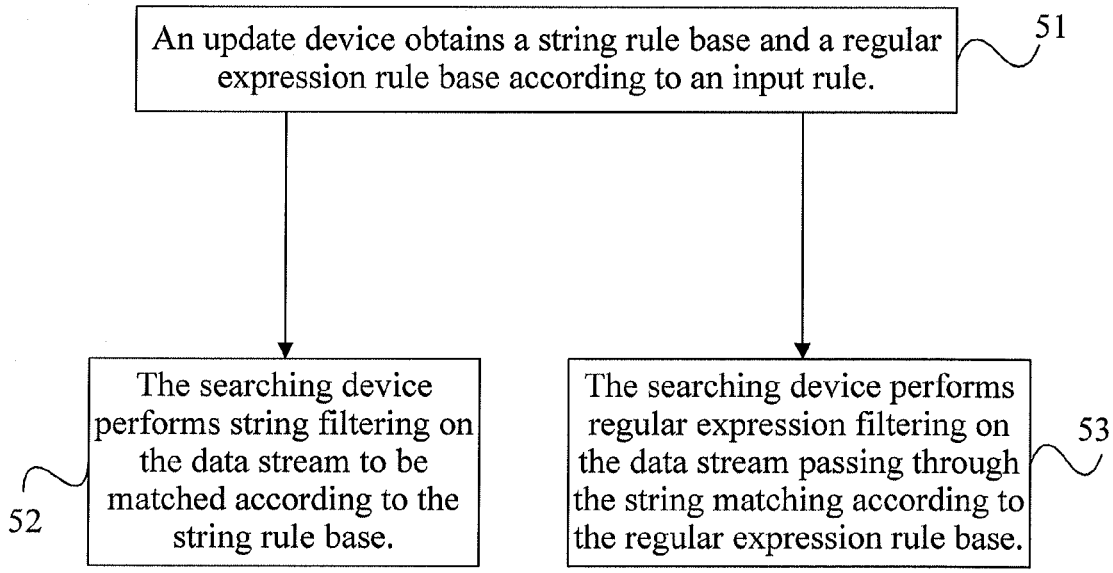
FIG. 5 is a schematic flow chart of a method according to Embodiment 2 of the present disclosure.

FIG. 5 is a schematic flow chart of a method according to Embodiment 2 of the present disclosure, where the method includes:

51: An update device obtains a string rule base and a regular expression rule base according to an input rule.

Since the efficiency of regular expression matching is higher, the current usual input rule is the regular expression. For the purpose of string matching, a string needs to be extracted from the input rule of the regular expression, and the string matching is performed by using the extracted string, in which the extracted string is called a "character word". In the specific embodiment, for example, it is assumed that the maximum length of the keyword of the data stream to be matched is L, the first string with the length L in the input rule of the regular expression may be used as the character word, and if the string with the length L cannot be extracted from the input rule, the string with the length nearest to L may also be used as the character word.

Subsequently, the string rule base is constructed by using the character word, and the regular expression rule base is constructed by using the input rule after the character word is extracted, in which, a process of constructing the string rule base by using the character word may be a dynamic maintenance process, that is, the string rule base is first initialized, and then character words may be dynamically added or deleted.

52: The searching device performs string filtering on the data stream to be matched according to the string rule base. When Hash mapping positions of the keywords of the data stream are a subset of the Hash mapping positions of the character words, it indicates that the data stream passes through the string filtering.

53: The searching device performs regular expression filtering on the data stream passing through the string matching according to the regular expression rule base.

In the string filtering process in this embodiment, when the Hash mapping positions of the keywords of the data stream belong to the Hash mapping positions of the character words, it indicates that the data stream passes through the string filtering. Therefore, it is not required to store the keywords and further compare the keywords with the character words, thereby saving the storage space and improving performance.

The bloom filter method may be referred to, and the string rule base is constructed and dynamically maintained by using the character words. However, each bit of a bit array of the current bloom filter can only be 0 or 1, when a plurality of character words is mapped onto the same bit, the bit can still only be 1, and when it is required to delete any one of the plurality of character words, a problem may occur in the processing at the mapping position. For example, when a certain character word is deleted, the original mapping position of the character word should be set to 0, and be no longer 1. However, since other character words may be mapped onto the position, the position cannot be modified to 0, and a contradiction may exist accordingly, and it is difficult to determine whether to set the bit to 0 or 1.

In order to solve the foregoing contradiction, in the embodiment of the present disclosure, a counting array may be set corresponding to the bit array of the bloom filter, and each counting element of the counting array corresponds to each bit of the bit array of the bloom filter, which is configured to calculate the number of the character words mapped onto the corresponding bit. For example, the bit array of the bloom filter has m bits (that is, a Hash value range obtained through the Hash operation is from 1 to m), a constructed counting numeric value includes m counting elements, and the bit width of each counting element is $\lceil \log_2 N \rceil$, in which $\lceil * \rceil$ represents round up and N is the number of the character words. The reason that the bit width of each counting element is set to $\lceil \log_2 N \rceil$ is to ensure an extreme case that all the character words are mapped onto a certain bit. In this embodiment, the number of the character words is usually not large, and the bit width of each counting element is usually 16 bits or 32 bits.

On the basis of the foregoing analysis, the process of maintaining the string rule base in the embodiments of the present disclosure may include an initialization process, an adding process, and a deletion process, which are as follows.

Figure 6:
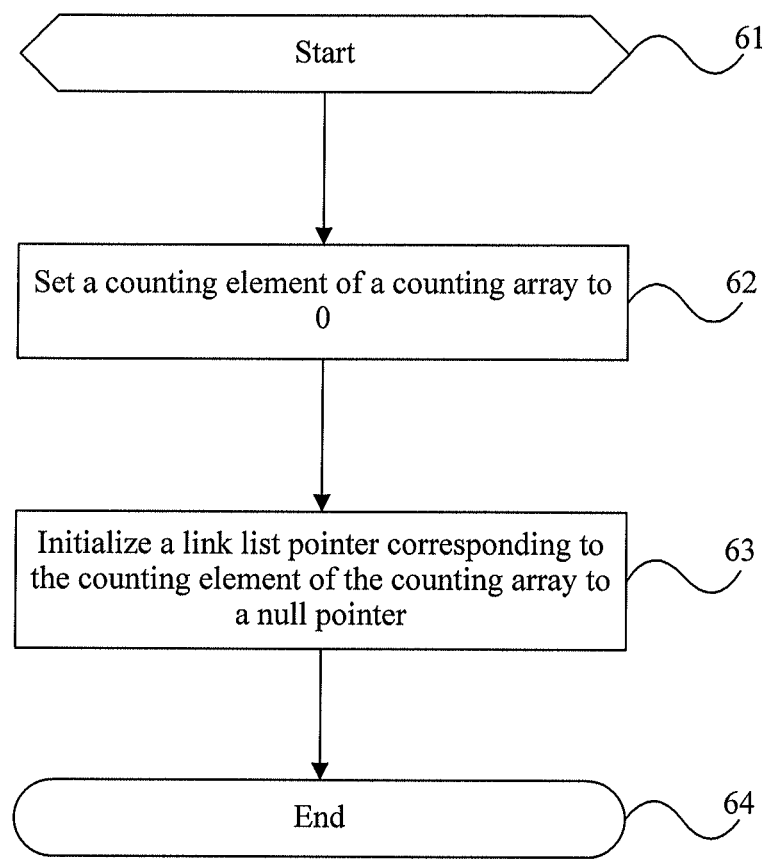
FIG. 6 is a schematic flow chart of a method for initializing a string rule base according to Embodiment 2 of the present disclosure.

FIG. 6 is a schematic flow chart of a method for initializing a string rule base according to Embodiment 2 of the present disclosure, where the method includes:

61: Start.

62: Set a counting element of a counting array to 0.

63: Initialize a linked list pointer corresponding to the counting element of the counting array to a null pointer.

Similar to a manner of the drop-down linked list with a bit element in an existing bloom filter, the drop-down linked list with the counting element in this embodiment and is configured to store the character words, and definitely, the linked list may also be the drop-down at the bit element of the bit array.

64: End.

Figure 7:
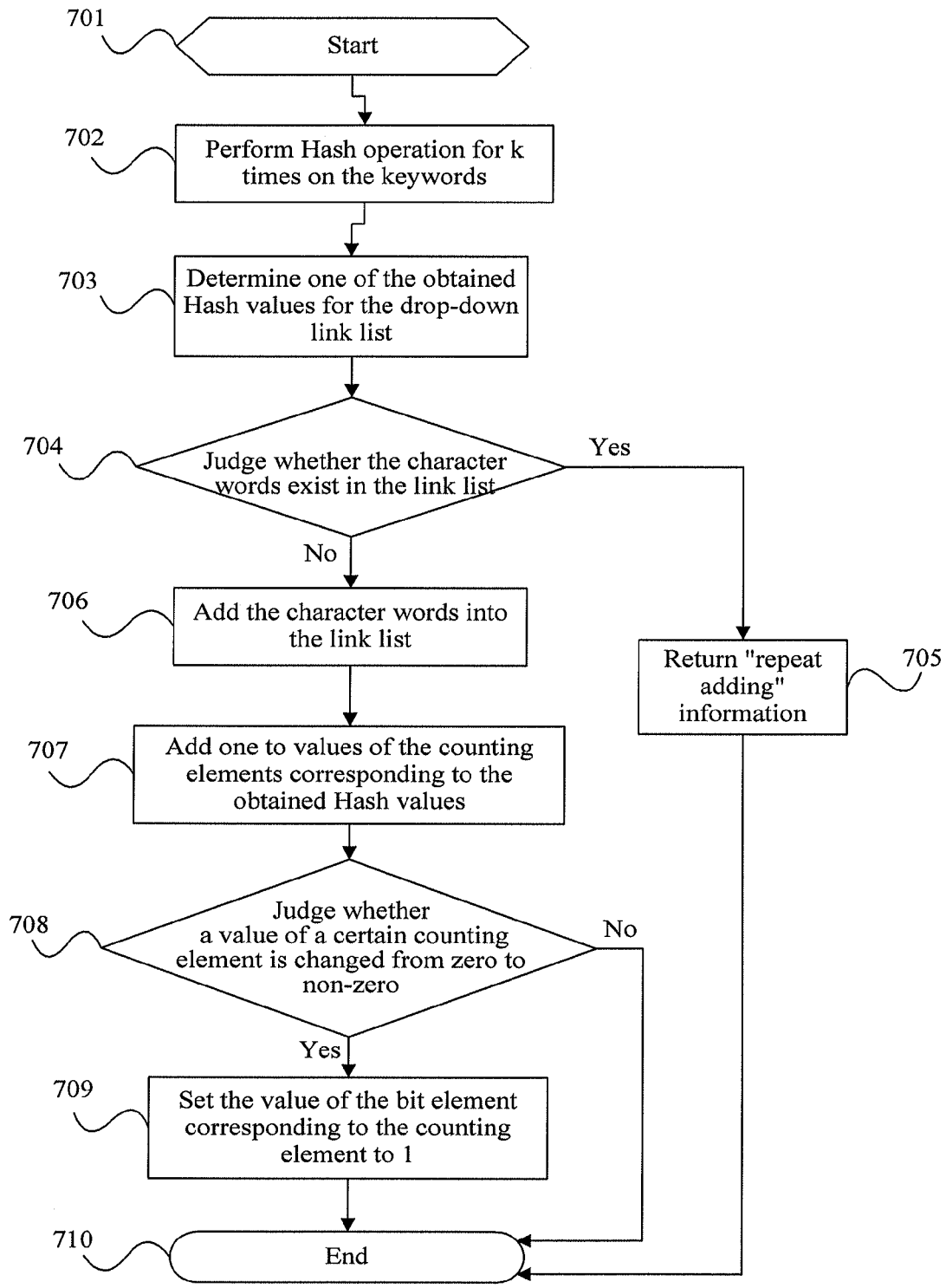
FIG. 7 is a schematic flow chart of a method for adding a string rule base according to Embodiment 2 of the present disclosure.

FIG. 7 is a schematic flow chart of a method for adding a string rule base according to Embodiment 2 of the present disclosure, where the method includes:

701: Start.

702: Perform Hash operation for k times on the character words to be added by using k Hash functions independent from each other, and then obtain M Hash values, in which, the numeric value of K and the Hash functions may be set according to practical requirements.

703: Determine one of the M Hash values for the down-drop linked list, in which the linked list is configured to store the character words, for example, a minimum value in the obtained M Hash values is determined to be an address for the drop-down linked list.

704: Traverse the drop-downlinked list at the minimum value to see whether the character words are included, if yes, perform 705; otherwise, perform 706.

705: Return "repeat adding" information. Subsequently, perform 710.

706: Add the character words into the linked list.

707: Add 1 to values of the counting elements corresponding to the M Hash values. For example, if the M Hash values are respectively 1, 3, and 5, add 1 to the values of the first, third, and fifth counting elements of the counting array respectively.

708: Determine whether a value of a certain counting element is changed from zero to non-zero (for example, 1), if yes, perform 709; otherwise, perform 710.

709: Set the value of the bit element corresponding to the counting element to 1, in which, the bit element is an element in the bit array, and the bit array is the bloom filter.

710: End.

The foregoing process is performed on each character word, and it can be seen from the foregoing process that, the value of the counting element may be any value from 0 to N, in which N is the number of the character words. However, the value of the bit element can only be 0 or 1, and similar to the bloom filter, only works in the mapping for the first time.

Figure 8:
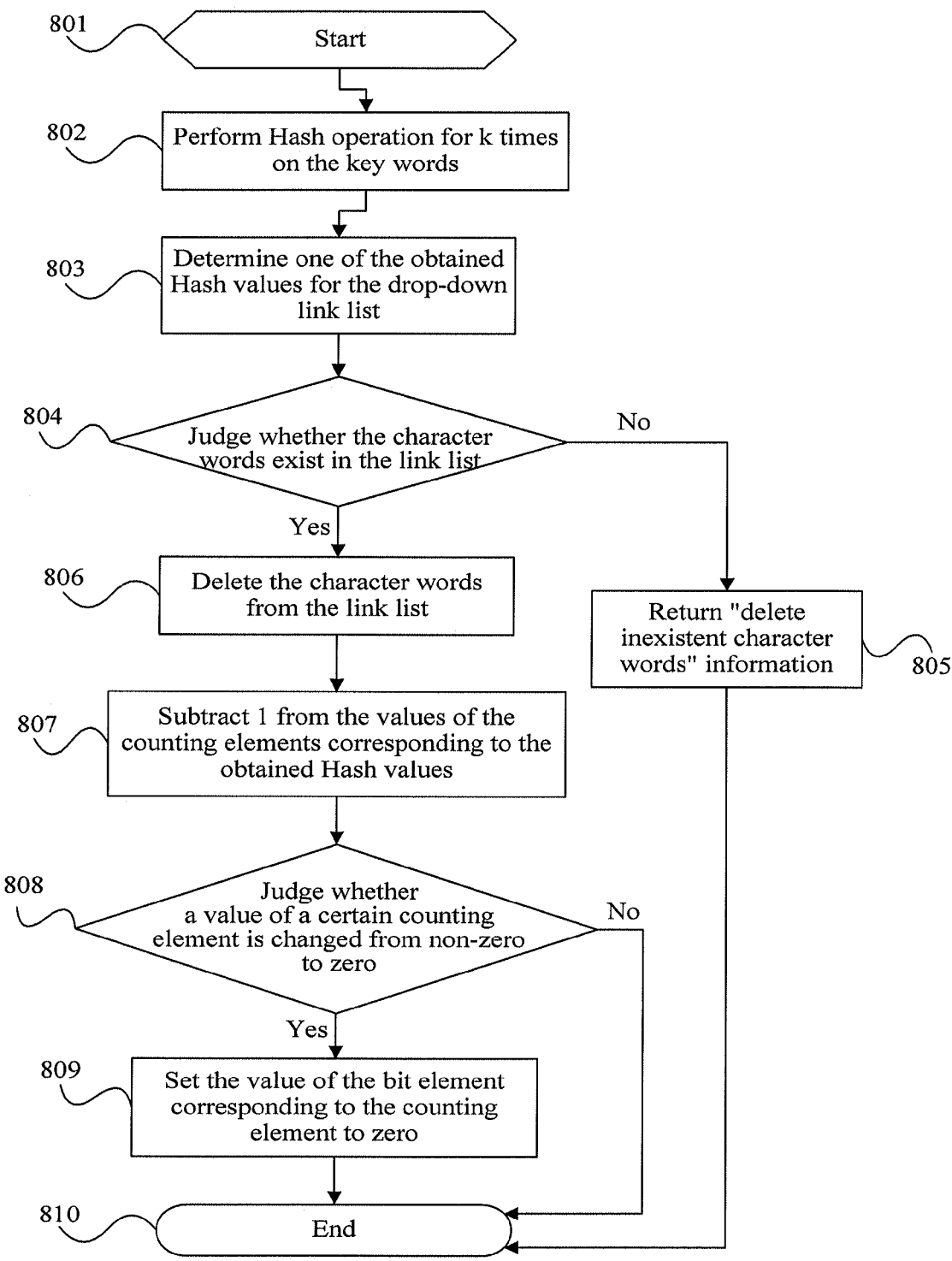
FIG. 8 is a schematic flow chart of a method for deleting a string rule base according to Embodiment 2 of the present disclosure.

FIG. 8 is a schematic flow chart of a method for deleting a string rule base according to Embodiment 2 of the present disclosure, where the method includes:

801: Start.

802: Perform Hash operation for k times on the character words to be deleted by using k Hash functions independent from each other, and obtain M Hash values.

803: Determine one of the M Hash values for the drop-down linked list, in which the linked list is configured to store the character words, for example, a minimum value in the obtained M Hash values is determined to be an address for the drop-down linked list.

804: Traverse the drop-down linked list at the minimum value to see whether the character words are included, if yes, perform 806; otherwise, perform 805.

805: Return "delete inexistent character words" information. Subsequently, perform 810.

806: Delete the character words from the linked list.

807: Subtract 1 from the values of the counting elements corresponding to the M Hash values in sequence. For example, if the M Hash values are respectively 1, 3, and 5, subtract 1 from the values of the first, third, and fifth counting elements of the counting array respectively.

808: Determine whether the value of the counting element is changed from non-zero to zero, if yes, perform 809; otherwise, perform 810.

809: Set the value of the bit element corresponding to the counting element to 0, in which, the bit element is an element in the bit array, and the bit array is the bloom filter. For example, if the first counting element in the counting array is changed from non-zero to zero (since one is subtracted from the values of the counting elements in sequence, here one usually is changed to zero), the first bit element in the bit array is set to zero. That is to say, when a plurality of character words is mapped onto the same position, only after the plurality of character words is completely deleted, the value on the corresponding position can be set to zero; otherwise, the value keeps at 1.

810: End.

The foregoing process is performed on each character word, and it can be seen from the foregoing process that, by setting the counting array, when a plurality of character words is mapped onto the same position, only after the plurality of character words is completely deleted, the value on the corresponding position can be set to zero, thereby solving a problem of deletion conflict since only the bit array exists currently.

On the basis of the constructed string rule base, in the embodiments of the present disclosure, string filtering may be performed during string filtering according to the constructed string rule base. As for the details, reference may be made to the following embodiment.

Figure 9:
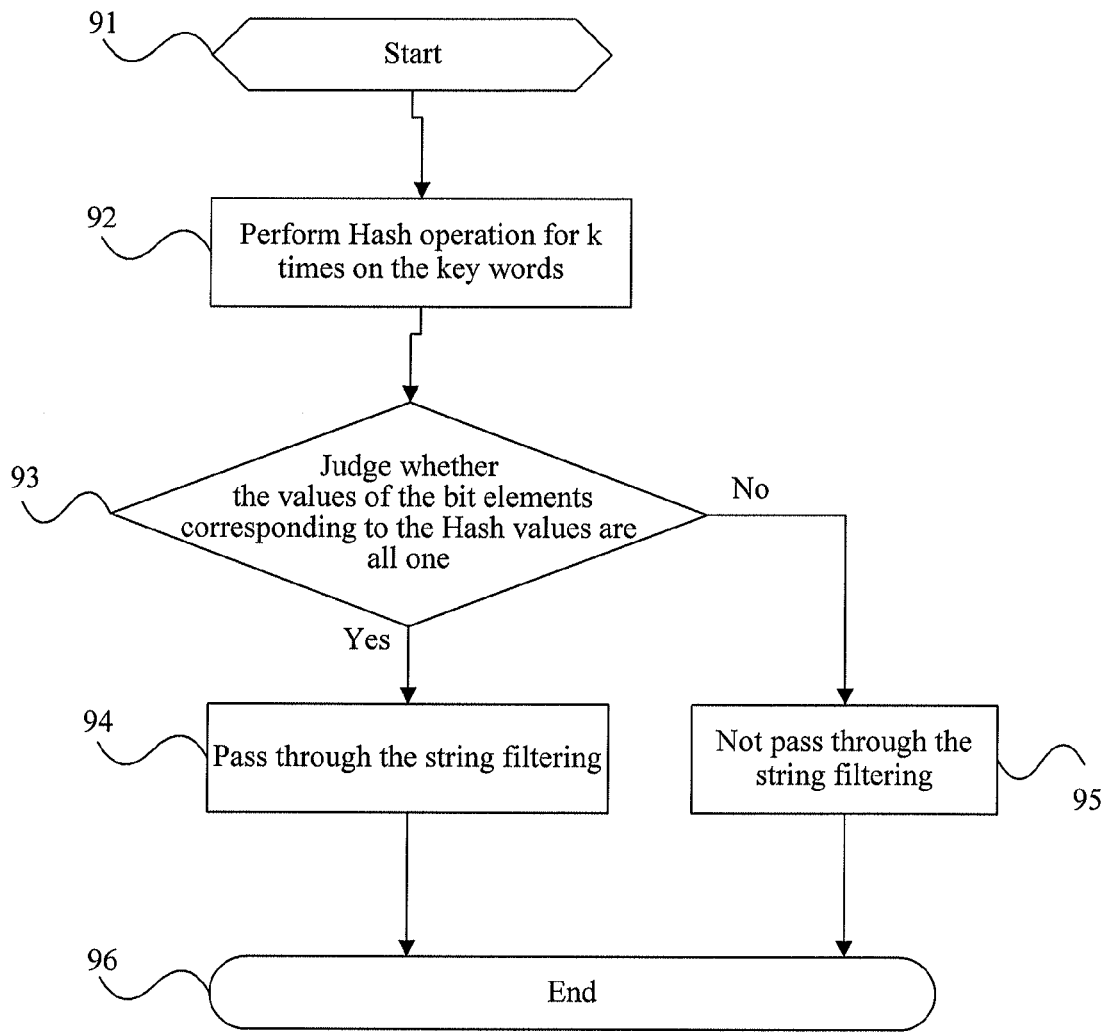
FIG. 9 is a schematic flow chart of a string filtering method according to Embodiment 2 of the present disclosure.

FIG. 9 is a schematic flow chart of a string filtering method according to Embodiment 2 of the present disclosure, where the method includes the follow steps.

91: Start.

92: A searching device performs Hash operation for k times on keywords in a data stream to be matched by using k Hash functions, and then one or more Hash values are obtained, in which, the k Hash functions should be the same as the k Hash functions during character word processing.

93: The searching device determines whether values of bit elements corresponding to the one or more Hash values are all one, if yes, perform 94; otherwise, perform 95.

It can be seen from the embodiment shown in FIG. 7 that, when the character words are mapped onto a certain bit of the bit array, the bit is set to one, and when the value of the bit element corresponding to the Hash value in 93 is one, it indicates that a Hash mapping position of the keyword belongs to the Hash mapping position of the character word, and the keyword passes through the string filtering.

94: It is acquired that the data stream passes through the string filtering. Subsequently, perform 96.

In a precise string matching process in the prior art, when the bit elements corresponding to the Hash values of the keywords are all one, it cannot be acquired whether the data stream passes through the string filtering, and it is required to further compare the keywords with the character words. Only when the keywords and the character words are completely same, it indicates that the data stream passes through the string filtering. However, in this embodiment, it is not required to perform the subsequent further comparison process, and compared with the current precise string matching, this embodiment may be called "blurred string matching". Since the regular expression matching is further performed on the data stream after the string matching, and the precision of the regular expression matching is high, the precision of the previous string matching may be not required to be very high, and the previous string matching is mainly to realize the grouping, thereby lowering the operation complexity of mere regular expression matching. In addition, although this embodiment is blurred matching, since Hash operation is performed for k times, the precision may be improved to a certain degree.

95: It is acquired that the data stream does not pass through the string filtering. Subsequently, perform 96.

96: End.

In the string filtering process in this embodiment, when the Hash mapping positions of the keywords of the data stream belong to the Hash mapping positions of the character words, it indicates that the data stream passes through the string filtering. Therefore, it is not required to store the keywords and further compare the keywords with the character words, thereby saving the storage space and improving performance.

The string filtering process is described above, and the regular expression filtering is performed on the data stream passing through the string filtering, in which the regular expression configured for regular expression filtering is the input rule after the character words are extracted. The regular expression may be stored in an off-chip Random Access Memory (RAM), and specifically, a Dynamic Random Access Memory (DRAM) or a Static Random Access Memory (SRAM) may be used. In addition, a first address for storing the regular expression may be determined according to the Hash value of the corresponding character word. For example, if an input rule is divided into a first character word and a first regular expression, the first address A of the first regular expression may be determined through the following method. The Hash operation is performed on the first character word to obtain a Hash value B by using one of the k Hash functions or a certain Hash function (a Hash function H), and subsequently, a left shift bit b is determined according to a value of the first regular expression, and then, B is shifted to left by b bits to obtain A. Subsequently, the first regular expression is stored in the RAM using A as the first address.

Since the regular expression is stored on the off-chip RAM, a regular expression filtering process in the embodiment of the present disclosure is as follows.

Figure 10:
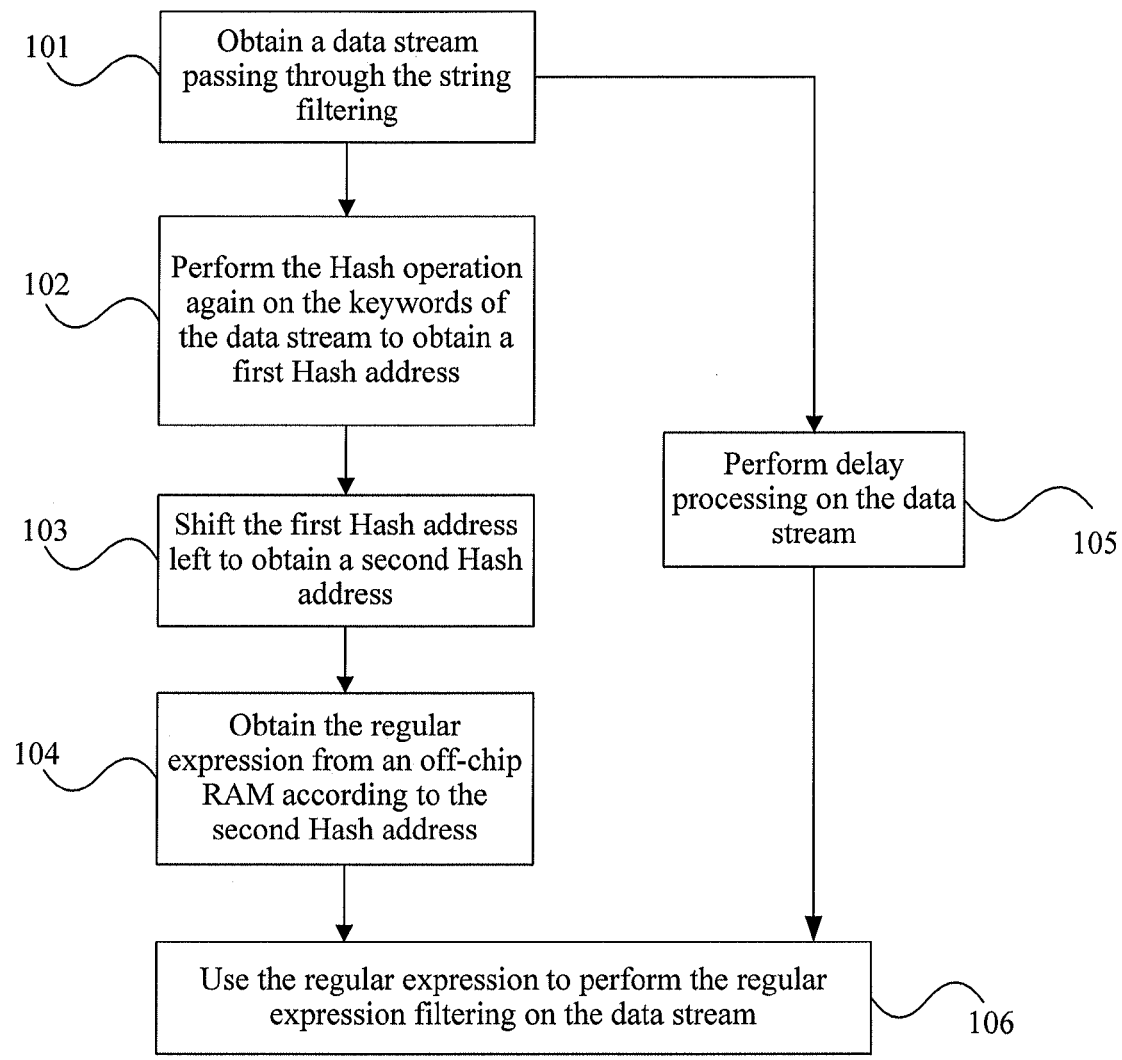
FIG. 10 is a schematic flow chart of a regular expression filtering method according to Embodiment 1 of the present disclosure.

FIG. 10 is a schematic flow chart of a regular expression filtering method according to Embodiment 1 of the present disclosure, where the method includes:

101: Obtain a data stream passing through the string filtering. Subsequently, perform 102 and 105 respectively.

102: Perform Hash operation again on keywords of the data stream to obtain a first Hash address, in which a Hash function used during the Hash operation is the Hash function H used during the storage of the regular expression.

103: Shift the first Hash address left to obtain a second Hash address, in which the left shift bit is the bit b during the storage of the regular expression.

104: Obtain the regular expression from an off-chip RAM according to the second Hash address.

105: Perform delay processing on the data stream, and duration of the delay processing is the same as the duration of obtaining the regular expression from the off-chip RAM.

106: Use the regular expression to perform the regular expression filtering on the data stream.

The algorithm used during the regular expression filtering may be NFA, DFA or Hybrid Finite Automata (HFA, hybrid algorithm of the NFA and the DFA). A main point of the embodiment of the present disclosure lies in that, the string filtering in a pre-matching phase adopts the foregoing blurred matching manner during the regular expression matching, and the specific algorithm in a specific regular expression filtering phase is not limited, which may adopts either one (or hybrid) of the current regular expression filtering methods.

Figure 11:
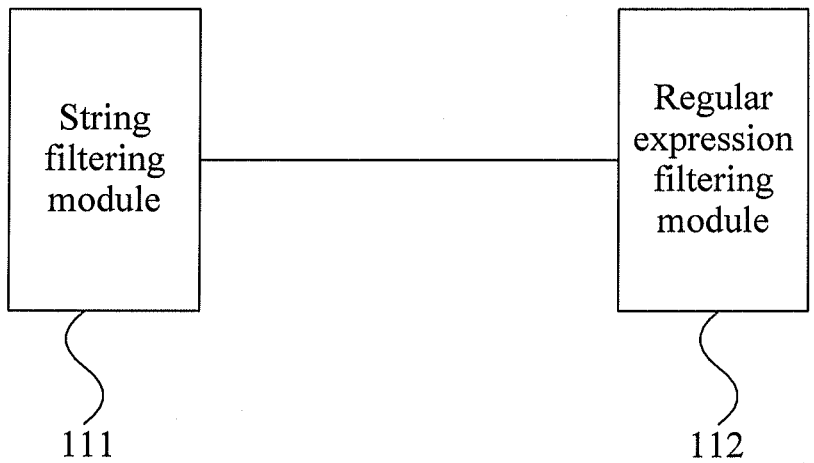
FIG. 11 is a schematic structural view of a searching device according to Embodiment 3 of the present disclosure.

FIG. 11 is a schematic structural view of a searching device according to Embodiment 3 of the present disclosure, where the device includes a string filtering module 111 and a regular expression filtering module 112. The string filtering module 111 is configured to perform string filtering on a data stream to be matched, in which if keywords in the data stream and preset character words have at least one same character, it indicates that the data stream passes through the string filtering; and the regular expression filtering module 112 is configured to perform regular expression filtering on the data stream passing through the string filtering.

For example, the string filtering module may include a first unit, a second unit, and a third unit. The first unit is configured to perform Hash operation on the keywords of the data stream, so as to obtain Hash values of the keywords; the second unit is configured to determine whether Hash mapping positions of the keywords of the data stream are a subset of the Hash mapping positions of the character words; and the third unit is configured to obtain that the data stream passes through the string filtering.

In the string filtering process in this embodiment, when the keywords in the data stream and the preset character words have the same characters, and both are not required to be completely same, it indicates that the data stream passes through the string filtering. Therefore, it is not required to store the keywords and further compare the keywords with the character words, thereby saving storage space and improving performance.

Figure 12:
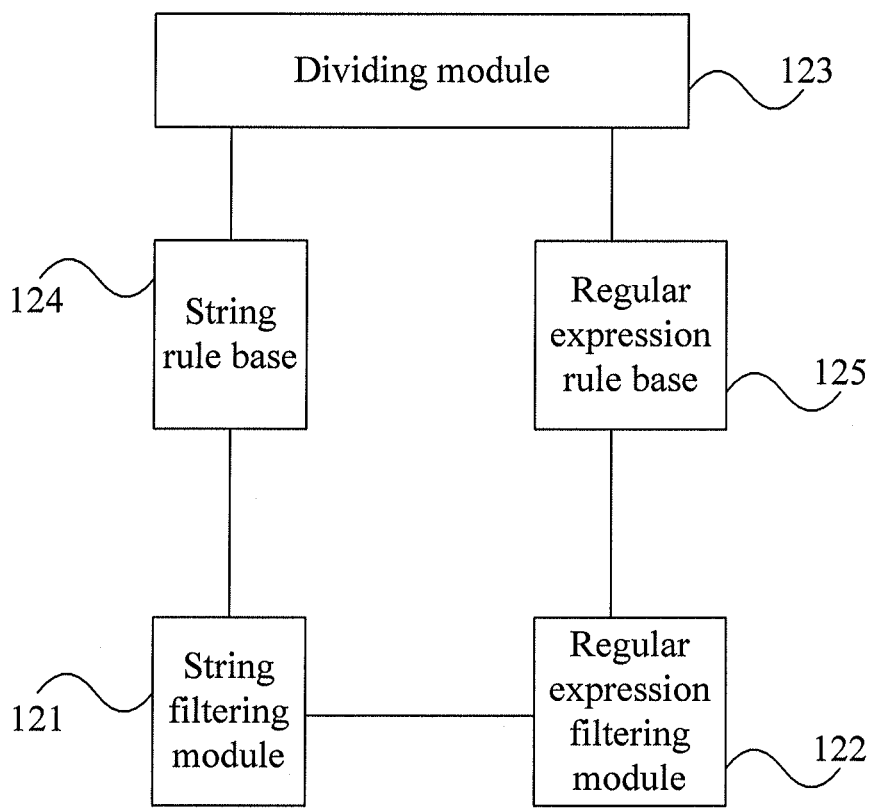
FIG. 12 is a schematic structural view of a system according to Embodiment 4 of the present disclosure.

FIG. 12 is a schematic structural view of a system according to Embodiment 3 of the present disclosure, where the system includes the searching device as described in FIG. 11, that is, the system includes a string filtering module 121 and a regular expression filtering module 122, and further includes an update module. The update module includes a dividing module 123, a string rule base 124, and a regular expression rule base 125. The dividing module 123 is configured to divide an input rule into a character word and a regular expression; the string rule base 124 is obtained according to the character word, in which the string filtering module 121 is configured to perform string filtering according to the string rule base; and the regular expression rule base 125 is configured to store the regular expression, in which the regular expression filtering module 122 is configured to perform the regular expression filtering according to the regular expression rule base.

For example, the string rule base may include an initialization unit and an adding unit. The initialization unit is configured to establish a bit array corresponding to the character word, a counting array corresponding to the bit array, and a drop-down linked list configured to store the character words, set counting elements in the counting array to zero, and set a linked list pointer pointing to the linked list to a null pointer. The adding unit is configured to perform Hash operation for k times on the character words to be added by using k Hash functions to obtain Hash values of the character words to be added, add one to values of the counting elements in the counting array corresponding to the Hash values of the character words to be added, and set a value of the bit element corresponding to the counting element changing from zero to non-zero to one. At this time, the second unit is configured to obtain the Hash values of the keywords after performing the Hash operation on the keywords of the data stream by using k Hash functions, and determine whether Hash mapping positions of the keywords of the data stream are a subset of the Hash mapping positions of the character words when the values of the bit elements corresponding to the Hash values of the key words are all one.

The string rule base in this embodiment may further include: a deletion unit, configured to perform the Hash operation for k times on the character words to be deleted by using k Hash functions to obtain the Hash values of the character words to be deleted, subtract one from the values of the counting elements in the counting array corresponding to the Hash values of the character words to be deleted, and set the value of the bit element corresponding to the counting element changing from zero to non-zero to zero.

In the string filtering process in this embodiment, when the keywords in the data stream and the preset character words have the same characters, and both are not required to be completely same, it indicates that the data stream passes through the string filtering. Therefore, it is not required to store the keywords and further compare the keywords with the character words, thereby saving the storage space and improving performance.

Those of ordinary skill in the art should understand that all or a part of the steps of the method according to the embodiments of the present disclosure may be implemented by a program instructing relevant hardware. The program may be stored in a computer readable storage medium. The searching device may be a computing device having a processor configured to implement the disclosed method. When the program is run, the steps of the method according to the embodiments of the present disclosure are performed by the processor. The storage medium may be any medium that is capable of storing program codes, such as a read-only memory (ROM), a RAM, a magnetic disk, or an optical disk that is accessible to the processor.

Finally, it should be noted that the above embodiments are merely provided for describing the technical solutions of the present disclosure, but not intended to limit the present disclosure. It should be understood by persons of ordinary skill in the art that although the present disclosure has been described in detail with reference to the embodiments, modifications can be made to the technical solutions described in the embodiments, or equivalent replacements can be made to some technical features in the technical solutions, as long as such modifications or replacements do not depart from the spirit and scope of the present disclosure.

What is claimed is:

1. A regular expression filtering method, comprising:
    obtaining a string rule base and a regular expression rule base; wherein obtaining the string rule base comprises:
        extracting character words from an input rule;
        establishing a bit array corresponding to the character words, a counting array corresponding to the bit array, and a drop-down linked list configured to store the character words; and
        obtaining the string rule base according to the counting array, the bit array, and the linked list;
    performing a string filtering on a data stream to be matched according to the string rule base, if keywords in the data stream and the character words have at least one same character, indicating that the data stream passes through the string filtering; wherein the at least one same character comprises: Hash mapping positions of the keywords of the data stream that are a subset of Hash mapping positions of the character words; and
    performing regular expression filtering on the data stream that passes through the string filtering according to the regular expression rule base; wherein performing the string filtering on the data stream to be matched, comprises:
        performing Hash operation on the keywords of the data stream to obtain Hash values of the keywords;
        determining whether the Hash mapping positions of the keywords of the data stream belong to the Hash mapping positions of the character words;
        acquiring the data stream that passes through the string filtering when the Hash mapping positions of the keywords of the data stream are the subset of the Hash mapping positions of the character words.

2. The method according to claim 1, wherein the obtaining the string rule base comprises: initializing the string rule base, and
    initializing the string rule base comprises:
    setting counting elements in the counting array to zero; and
    setting a linked list pointer pointing to the linked list to a null pointer.

3. The method according to claim 2, wherein obtaining the string rule base further comprises a process of adding character words into the string rule base, and
    the process of adding the character words into the string rule base comprises:
    performing Hash operation for k times on the character words to be added by using k Hash functions to obtain Hash values of the character words to be added;
    adding one to values of the counting elements in the counting array corresponding to the Hash values of the character words to be added; and
    setting a value of a bit element corresponding to the counting element changing from zero to non-zero to one;
    the Hash mapping positions of the keywords of the data stream being the subset of the Hash mapping positions of the character words comprises: the values of the bit elements corresponding to the Hash values obtained after performing the Hash operation on the keywords of the data stream by using the k Hash functions are all one.

4. The method according to claim 3, further comprising:
    determining one of the Hash values of the character words to be added for the drop-down linked list; and
    adding character words to be added into the linked list when the character words to be added do not exist in the linked list.

5. The method according to claim 3, wherein the obtaining the string rule base further comprises a process of deleting character words from the string rule base, and
    the process of deleting the character words from the string rule base comprises:
    performing the Hash operation for k times on the character words to be deleted by using k Hash functions to obtain the Hash values of the character words to be deleted;
    subtracting one from the values of the counting elements in the counting array corresponding to the Hash values of the character words to be deleted; and
    setting the value of the bit element corresponding to the counting element changing from zero to non-zero to one.

6. The method according to claim 5, further comprising:
    deleting the character words to be deleted from the linked list when the character words to be deleted exist in the linked list.

7. The method according to claim 1, wherein the performing the regular expression filtering on the data stream passing through the string filtering comprises:
    obtaining a regular expression configured for the regular expression filtering;
    performing delay processing on the data stream passing through the string filtering, wherein duration of the delay processing is the same as duration of obtaining the regular expression; and
    using the regular expression to perform the regular expression filtering on the data stream passing through the string filtering.

8. A non-transitory computer readable medium including computer executable instructions that when implemented perform the steps of:
    obtaining a string rule base and a regular expression rule base; wherein obtaining the string rule base comprises:
        extracting character words from an input rule;
        establishing a bit array corresponding to the character words, a counting array corresponding to the bit array, and a drop-down linked list configured to store the character words; and
        obtaining the string rule base according to the counting array, the bit array, and the linked list;
    performing string filtering on a data stream to be matched according to the string rule base, wherein if keywords in the data stream and the character words have at least one same character, indicating that the data stream passes through the string filtering; wherein the at least one same character comprises: Hash mapping positions of the keywords of the data stream that are a subset of Hash mapping positions of the character words; and
    performing regular expression filtering on the data stream that passes through the string filtering according to the regular expression rule base; wherein performing the string filtering on the data stream to be matched, comprises;
        performing Hash operation on the keywords of the data stream to obtain Hash values of the keywords;
        determining whether the Hash mapping positions of the keywords of the data stream belong to the Hash mapping positions of the character words;
        acquiring the data stream that passes through the string filtering when the Hash mapping positions of the keywords of the data stream are the subset of the Hash mapping positions of the character words.

9. The non-transitory computer readable medium according to claim 8, wherein the computer executable instructions are configured to perform the steps of:

setting counting elements in the counting array to zero, and setting a linked list pointer pointing to the linked list to a null pointer; and performing Hash operation for k times on the character words to be added by using k Hash functions to obtain Hash values of the character words to be added, adding one to values of counting elements in the counting array corresponding to Hash values of the character words to be added, and setting a value of a bit element corresponding to the counting element changing from zero to non-zero to one;

obtaining Hash values of the keywords after performing the Hash operation on the keywords of the data stream by using k Hash functions, and determining whether Hash mapping positions of the keywords of the data stream are a subset of the Hash mapping positions of the character words when the values of the bit elements corresponding to the Hash values of the key words are all one.

10. The non-transitory computer readable medium according to claim 9, wherein the computer executable instructions are configured to perform the steps of:

performing the Hash operation for k times on the character words to be deleted by using k Hash functions to obtain the Hash values of the character words to be deleted, subtracting one from the values of the counting elements in the counting array corresponding to the Hash values of the character words to be deleted, and setting the value of the bit element corresponding to the counting element changing from zero to non-zero to zero.

* * * * *